Figure 14:
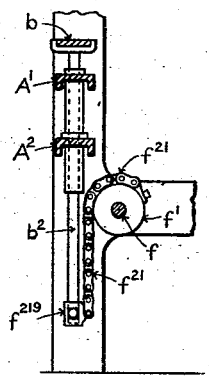

(No Model.) 2 Sheets—Sheet 1.
G. SHEPHERD & H. MIDGLEY.
RING SPINNING AND DOUBLING FRAME.
No. 501,736. Patented July 18, 1893.
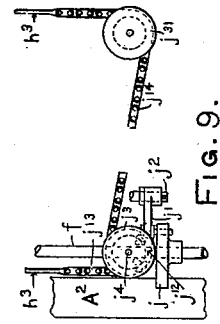
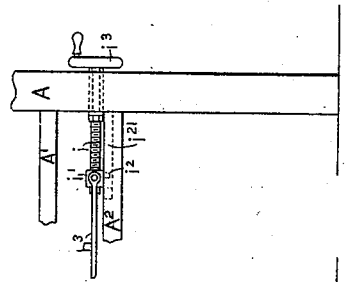
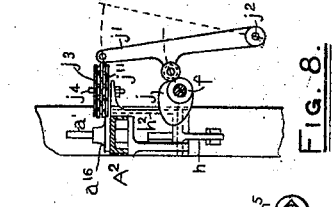
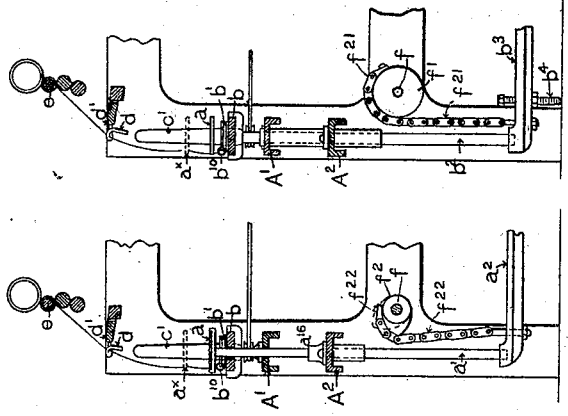
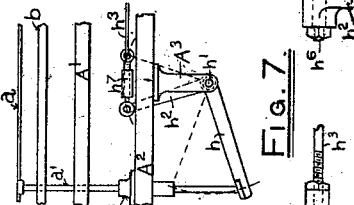
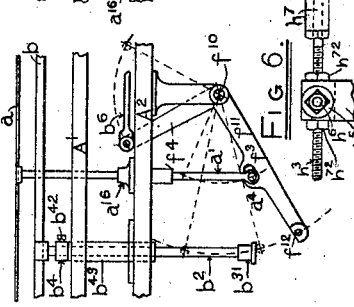
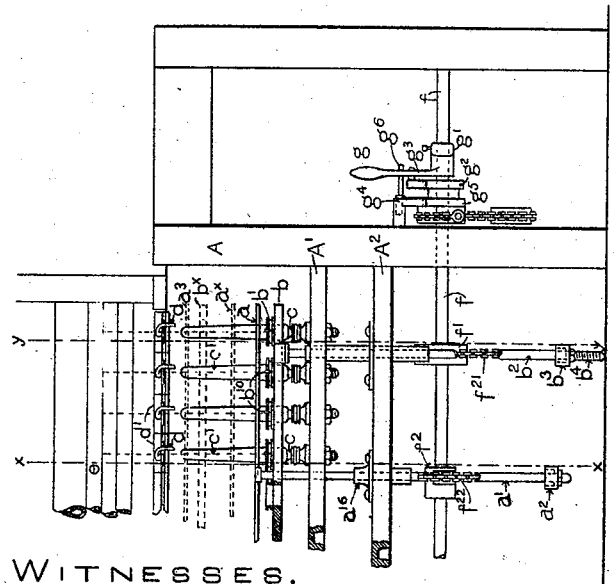
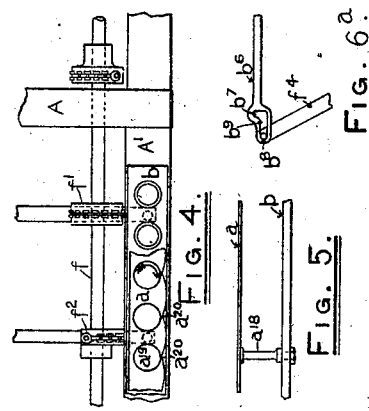
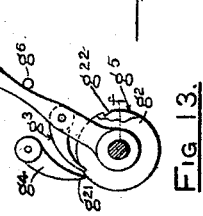
WITNESSES.
Saml. G. Stephens.
Hervey D. Melendy.
INVENTORS.
George Shepherd, and
Henry Midgley, by
Channing Whitaker
their attorney.

(No Model.) 2 Sheets—Sheet 2.

G. SHEPHERD & H. MIDGLEY.
RING SPINNING AND DOUBLING FRAME.

No. 501,736. Patented July 18, 1893.

WITNESSES.
Mary Caverly.
Saml. G. Stephens.

INVENTORS.
George Shepherd and H. Midgley
by Channing Whitaker
their attorney

UNITED STATES PATENT OFFICE.

GEORGE SHEPHERD AND HENRY MIDGLEY, OF BACUP, ENGLAND, ASSIGNORS, BY MESNE ASSIGNMENTS, TO THE LOWELL MACHINE SHOP, OF LOWELL, MASSACHUSETTS.

RING-SPINNING AND DOUBLING FRAME.

SPECIFICATION forming part of Letters Patent No. 501,736, dated July 18, 1893.

Application filed March 9, 1893. Serial No. 465,252. (No model.) Patented in England March 8, 1884, No. 4,566.

*To all whom it may concern:*

Be it known that we, GEORGE SHEPHERD and HENRY MIDGLEY, subjects of the Queen of Great Britain, residing at Bacup, in the county of Lancaster, England, have invented certain new and useful Improvements in or Applicable to Ring-Spinning and Doubling Frames, (for which we have received Letters Patent of Great Britain, No. 4,566, dated March 8, 1884;) and we do hereby declare that the following is a full, clear, and exact description of the invention, which will enable others skilled in the art to which it appertains to make and use the same.

Our invention relates to the means which are employed in ring-spinning frames and doubling-frames for the purpose of preventing or obviating what is known as the "ballooning" of the threads being spun or twisted in such frames.

It consists first in an anti-ballooning or yarn-separating arrangement or device of novel and improved construction, and second in certain improved constructions and combinations of mechanism for supporting and actuating, or moving up and down, the arrangement or device which may be employed in a ring-frame or doubling-frame for preventing the said ballooning.

The invention will be described with reference to the accompanying drawings, and then the features thereof will be particularly pointed out and clearly defined in the claims at the close of this specification.

In the drawings, Figure 1 is a view in front elevation of part of a ring-frame at one end thereof, the same being provided with our invention. Fig. 2 is a view in vertical section on line $x$—$x$ of Fig. 1. Fig. 3 is a view in vertical section on line $y$—$y$ of Fig. 1. Fig. 4 is a view in plan of certain of the parts that are shown in Fig. 1. Fig. 5 is a view in front elevation showing our improved anti-ballooning or yarn-separating device mounted on supports carried by the ring-rail or copping-rail. Fig. 6 is a view in front elevation showing a modification. Fig. 6ª is a view of a detail of construction. Fig. 7 is a view in front elevation showing another modification. Fig. 8 is a view in side elevation, partly in vertical section, illustrating actuating mechanism fitted for use in connection with the devices that are shown in Fig. 7. Fig. 9 is a view in plan of some of the parts that are shown in Fig. 8, but showing certain parts pertaining to both sides of a frame. Fig. 10 is a view in front elevation illustrating one form of actuating mechanism. Figs. 11 and 12 are enlarged views of details. Fig. 13 is an enlarged view showing details. Figs. 14, 15, 16, 17, 18 and 19 are views showing modifications which are hereinafter presented.

Having reference more particularly to Figs. 1 to 4, at $e$ are shown the front rolls of a ring-frame, at $d$ the thread-guides or guide-wires, at $d'$ the finger-boards, at $c$ the spindles, at $c'$ the bobbins which are mounted upon the spindles, at $b'$ the rings, at $b^{10}$ the travelers which are mounted on the rings, at $b$ the ring-rail, at $b^2$ one of the pokers whereby the ring-rail is sustained, at $A'$ the spindle-rail, and at $A^2$ the lower or guide-rail. All of these parts are of any known and desired character and construction.

At $a$ is shown the plate or rail provided with the anti-balooning or yarn-separating arrangement or device.

In Fig. 4 we have shown in plan our improved form and construction thereof. It consists of a thin plate or rail of metal with a circular hole $a^{19}$ cut out of it for each spindle, each hole being concentric with its spindle $c$ and the corresponding ring $b'$, and a little larger in diameter than the inner diameter of the ring, so that a full cop or bobbin will pass clear through the hole $a^{19}$.

As shown in Fig. 4 the front edge of the plate or rail is formed with a series of rounded swells and re-entrant angles, and there is a slit $a^{20}$ through such front edge leading from each of such angles to the adjacent hole $a^{19}$, to allow the thread to pass, this slit $a^{20}$ being made at about a tangent to the circle of the hole $a^{19}$. The thread in each case rotates around within the hole in the direction of the arrow shown in Fig. 4, so that it passes freely over and past the opening of the slit and will not escape. If the threads rotate in the direction opposite to that shown by the arrow, the direction of the slits will have to be reversed accordingly.

The anti-ballooning or yarn-separating device constructed as shown is mounted upon suitable supports in a ring-frame or doubling-frame and maintained thereby in proper position relatively to the spindles and ring-rail. The spindles extend upward through the holes $a^{19}$, and thus the anti-ballooning or yarn-separating arrangements which the plate or rail $a$ provides are located beside the spindles in a position to operate by interfering with the tendency of the yarn-balloons to expand during the rotation of the spindles. If desired, the anti-ballooning or separating device may be secured to the upper ends of short rods or posts $a^{18}$, Fig. 5, projecting upwardly from the ring-rail $b$. We prefer, however, to mount it upon vertical rods $a'$ such as those which are shown in other figures of the drawings, these rods being made vertically movable, like the pokers $b^2$ of the ring-rail, and being connected with suitable actuating devices by means whereof the anti-ballooning or yarn-separating device may be moved up and down as required.

At $a^{16}$ is shown a guide such as is provided for each rod $a'$, whereby the said rod is held in vertical position.

In accordance with the second portion of our invention we actuate, independently of the ring-rail, the plate or rail provided with the described anti-ballooning or yarn-separating arrangements, or any other substituted rail provided with equivalent anti-ballooning or yarn-separating arrangements which are located beside the spindles and operate by contact with the ballooning yarns, by operating devices having separate connection with the said plate or rail.

A characteristic feature of the actuating devices which embody our invention is the fact that such devices cause the anti-ballooning or yarn-separating plate or rail to move up and down in unison with the ring-rail or copping-rail but at a reduced rate of speed and to a reduced extent, and maintain the anti-ballooning or yarn-separating plate or rail at all times at a height above the ring-rail or copping-rail which is proper for the most efficient service.

One modification of our actuating devices is represented in Figs. 1 to 4, which show at $f$ a shaft extending horizontally lengthwise of the frame at one side of the latter, and forming part of ring-rail operating mechanism of a well known and common type. At $f'$ is a circular block or pulley on this shaft, there being one such pulley or block for each poker $b^2$ connected with the ring-rail $b$. One end of a jointed chain $f^{21}$ is secured to the periphery of the block or pulley $f'$ and the other end of the said chain is attached to a bar $b^3$ extending crosswise of the frame. The lower end of the poker $b^2$ represented in Figs. 1 and 3 is shown fitted to a hole in the said cross-bar, while on the opposite side of the frame the corresponding poker of the ring-rail on the latter side (not shown) enters a similar hole in the other end of the cross-bar. On this latter side, also, in practice, the shaft $f$ and the connections therefrom to the cross-bar $b^3$ are duplicated. Thereby, as the shafts $f$ are actuated from the copping motion, the ring-rails on both sides of the frame are caused to rise and fall in unison, as will be clearly understood. In some common and simpler arrangements the lower end of each chain $f^{21}$ is attached to an arm or collar $f^{219}$ fast on the lower end of the corresponding poker $b^2$ as in Fig. 14.

In respect of the foregoing the parts are or may be all as heretofore and as usual. For each rod $a'$ connected with the anti-ballooning or yarn-separating plate or rail we mount on the shaft $f$ a block or pulley $f^2$ of smaller diameter than the block or pulley $f'$ that is provided for each poker $b^2$, and to the periphery of each block $f^2$ we secure one end of a jointed chain $f^{22}$ having the other end thereof secured to a second cross-bar $a^2$. The said cross-bar has holes in its ends in which are received the lower ends of rods $a'$ on opposite sides of the frame, thereby providing for the actuation of the plates or rails $a$ on both sides of the frame after the manner of the actuation of the ring-rails. In consequence of the connections described, the anti-ballooning or yarn-separating plate or rail will be caused to move simultaneously with the ring-rail and in the same direction as the latter, but at a reduced speed, the entire extent of the vertical movement of the anti-ballooning or yarn-separating plate or rail being less than that of the vertical movement of the ring-rail. The block or pulley $f^2$ will be shaped as may be required to give the desired motion to the plate or rail $a$. We prefer to give a variable up and down motion to the said plate or rail in relation to the ring-rail, and this we effect by giving the block or pulley the shape that is represented in Fig. 2. During the regular working of the frame, the lowest point reached by the plate or rail $a$ in its traverse is that indicated in dotted lines at $a^x$ in Fig. 1. The highest positions of the ring-rail and plate or rail $a$ are indicated by the dotted lines at $a^3$ and $b^x$ in Fig. 1. For about the lowest one-fourth of the length of the yarn-load of the cops or bobbins we prefer to give motion to the anti-ballooning plate or rail at about the same speed as the ring-rail, but during the remaining portion of the said length the speed of the said plate or rail is diminished in relation to that of the ring-rail. When, for the purpose of doffing, the ring-rail is lowered, the anti-ballooning plate or rail follows it down until the position of the latter indicated by dotted lines at $a^x$ in Fig. 1 is reached. To arrest the descent of the ring-rail at the proper point, the cross-bar $b^3$ is provided with an adjustable screw-stop $b^4$ which strikes against the floor. In order to lower the anti-balloon plate or rail still farther, after the descent of the ring-rail has been arrested by stop $b^4$ as just indicated, so that the said plate or rail shall not interfere with the doffing, the shaft $f$ is turned farther by hand until the said plate or rail has been depressed to the position in which it is represented in full lines in Figs. 1 to 3, where it is retained in suitable manner until the doffing has been completed. During this continued rotation of the shaft $f$ the jointed chain connecting bar $b^3$ with block or pulley $f'$ becomes slack. In constructions from which the cross-bar $b^3$ is omitted the adjustable stop $b^4$ may be replaced by an adjustable collar on the poker $b^2$, such as that which is represented at $b^4$ in Fig. 6. In the construction that is shown in Figs. 1 to 4, however, it is most convenient to have the lower ends of the pokers loose in the sockets or holes formed therefor in the cross-bars $b^3$, and hence the form of stop shown in Figs. 1 and 3 is applied to the cross-bars in order to keep the latter from getting separated from the pokers when the jointed chains become slack after the ends of the said stops $b^4$ come against the floor.

It will be understood from the preceding description that, when a set of bobbins or cops is finished, the ring-rail or copping-rail $b$ and anti-balloon plate or rail are lowered until the ring-rail or copping-rail has reached the position for doffing, after which the anti-balloon plate or rail is brought still farther down by having additional movement given thereto as indicated, and it is held down while the set is being doffed.

A convenient means of giving to the shaft $f$ the additional movement required for lowering the anti-balloon plate or rail from the position shown in dotted lines at $a^x$ to the position shown in full lines in Figs. 1 to 3, is shown in Figs. 1 and 13. In these figures there is shown at $g$ a handle mounted to turn loosely on shaft $f$, and held in place at the side of collar $g^2$ fast on the shaft by means of a collar $g'$ which also is fast on the shaft. The handle $g$ has a pawl $g^3$ pivoted thereto, and the disk $g^2$ is formed with a notch $g^{21}$ with which the pawl $g^3$ is adapted to engage. After the ring-rail has been lowered, as just above described, the handle $g$ may be grasped and drawn forward, and thereby, in consequence of the engagement of the pawl $g^3$ with the notch $g^{21}$ in the disk $g^2$, the shaft $f$ may be rotated sufficiently to lower the anti-balloon plate or rail $a$ from the position indicated at $a^x$ to the position shown in full lines. When the shaft $f$ has been turned thus to the required extent, a pawl $g^4$, pivoted on a stud on the framing or on a bracket carried thereby, enters a notch $g^{22}$ in either the disk $g^2$, if desired, or a second disk $g^5$ also made fast on the shaft $f$. Thereby the parts are retained in the desired position during doffing. When that operation has been completed, the retaining pawl $g^4$ is released and turned back out of the way, and the shaft $f$ is allowed to go back to its normal position, the pawl $g^3$ on the handle $g$ being turned back also so as to be out of the way, and not catch in the notch or notches in the disk $g^2$ when the copping mechanism is at work. The handle $g$ rests against a stud $g^6$ projecting from the framing or a bracket attached to it when the copping motion is working.

Another common and well-known mode of actuating the ring-rail or copping-rail is by means of arms on shafts or axes placed across the frame, or at right angles with the lengthway of the ring-rail. In Fig. 6 we have shown this mode of actuating the ring-rail or copping-rail, and, also, have shown an embodiment of this part of our invention combined therewith. At $f^{10}$ in Fig. 6 is shown one of the said cross-shafts or axes, and at $f^{11}$ is shown the arm thereof, it carrying at its free end a stud or roller $f^{12}$ on which rests the foot or shoe $b^{31}$ of the poker $b^2$. The rocking movements of the cross-shaft $f^{10}$ and its arm $f^{11}$ occasion the ascending and descending movements of the poker $b^2$ and ring-rail $b$ in the well-known manner. At $f^4$ is an upwardly extending arm on the cross-shaft $f^{10}$, the cross shaft $f^{10}$ and its arms $f^4 f^{11}$ constituting what may be designated a rocker, and at $b^6$ is shown the connecting-rod by which the said arm $f^4$ is connected with the corresponding arm of the next adjacent cross-shaft and with the copping mechanism. We connect or engage the lower end of a rod $a'$ in suitable manner with each of the cross-shaft arms $f^{11}$, as by means of a pin $a^4$ on the lower end of the rod entering a slot $f^8$ extending lengthwise of the arm, whereby the anti-ballooning plate or rail $a$ is caused to rise and fall in unison with the ring-rail. The rod $a'$ is actuated from a portion of the cross-shaft arm $f^{11}$ which is intermediate the axis on which the said arm turns and the point at which motion is transmitted from the arm to the poker $b^2$. In consequence of thus operating separately the anti-balloon plate or rail from the cross-shaft arm through means independent of that whereby the ring-rail or copping-rail is actuated from the said arm, and of actuating such means from the intermediate portion of the arm as aforesaid, we are enabled to operate the anti-ballooning arrangement in such manner as to cause it to rise and fall at a reduced speed and to a reduced extent compared with the ring-rail or copping-rail, the distance between the anti-ballooning plate or rail and the ring-rail being reduced as the ring-rail rises. The illustrated connection of the rod $a'$ with the cross-shaft arm $f^{11}$ is positive, and causes movement to be transmitted to the rod $a'$ positively in both directions, so as to prevent the said rod from sticking in its guide $a^{16}$ and failing to descend at the proper time.

In Fig. 6 the poker $b^2$ is shown provided with a stop which is connected thereto and serves to arrest the descent of the ring-rail when, in being lowered by hand after the bobbins or cops have been wound to the desired extent, the ring-rail has descended to the point necessary to be reached thereby in order to permit the doffing to be effected. In the said figure the stop is constituted by a collar $b^4$, which is mounted upon the poker $b^2$ and secured in the desired position of adjustment thereon by a clamping screw $b^{42}$, and it is intended to contact with the upper end of the guide $b^{43}$ for the poker. The lowering of the arm $f^{11}$ which is required for the purpose of bringing the anti-balloon plate or rail into its lowest position for doffing is effected through moving by hand, or otherwise by power suitably applied thereto, the arm $f^{11}$ or any other arm or lever connected with the rod $b^6$, and holding such arm or lever by a catch or pawl while doffing.

In both the modification which is illustrated in Figs. 1 to 4 and that which is illustrated in Fig. 6, the ring-rails and connected parts may be lifted as usual by a preponderating counterbalance weight or weights, and during the regular working may be depressed by the copping or builder-motion mechanism through the medium of a chain or chains which can become slack when, in the one case, the shaft $f$ is turned by hand as hereinbefore described, or, in the other case, the arm $f^{11}$ is depressed in the manner described below its lowest normal position when working. This will permit the extra or additional lowering operations by which the anti-balloon plate or rail is depressed to position for doffing. The additional depression of the arm $f^{11}$ in the mechanism represented in Fig. 6, however, may be provided for by the arrangement shown in Fig. 6$^a$. In this figure, the rod or connection $b^6$ between the copping or builder-motion mechanism and the first lever or arm $f^4$ is formed with an enlarged end containing a slot $b^9$ for the reception of a pin $b^8$ projecting from the said arm $f^4$, the said slot having at one end thereof an offset or notch $b^7$ in which the pin $b^8$ fits during the regular working of the parts. By lifting the end of the rod, the notch is withdrawn from the pin, and the arm $f^4$ is then allowed to move to the left, thereby permitting the anti-balloon plate or rail to descend. By moving the arm $f^4$ to lift the anti-balloon plate or rail again the pin $b^8$ will enter again the notch $b^7$. Other known and suitable lengthening and shortening arrangements might be used in lieu of that shown in Fig. 6$^a$.

The rod $a'$ supporting the plate or rail $a$ may be operated independently of the ring-rail or copping-rail by means of rockers in the form of bell-crank levers provided with suitable means for turning the same on their pivots to raise and lower the said plate or rail as desired.

In Fig. 7 we have represented a modification in which it is contemplated that the plate or rail shall thus be operated. In the said figure, one of the bell-crank levers is shown at $h$, it having its fulcrum $h'$ on a bracket $A^3$ secured to the rail $A^2$. The arm $h^2$ of the said lever is connected with the corresponding arms of the other levers of the series that is employed by a wire or rod $h^3$ passing from one of the said arms to the others thereof, the said wire or rod being composed of parts that are united by a right-and-left-handed screw coupling $h^7$ whereby to effect adjustment of the combined length of such parts and adjust the position of the left-hand lever or levers $h$ and the level of the plate or rail $a$. The end of the arm $h^2$ of each lever $h$ is or may be formed with an eye $h^5$ swiveling on a pin $h^6$ passing through a hole in the end of the arm, as shown in detail in Figs. 11 and 12. The rod or wire $h^3$ connecting the arms $h^2$ of the levers $h$ in this case is made to pass through the eye $h^5$, and there is a screw-nut $h^{72}$ on each side of the swivel eye $h^5$, so that each bell-crank lever $h$ may be adjusted separately without disturbing the adjustment of the other levers. The levers $h$ may be moved for the purpose of moving or adjusting up and down the plate or rail $a$ by various means. The arrangement shown in Fig. 10 may be employed. In this latter figure, the rod or wire $h^3$ is shown connected at its end with a nut $i'$ mounted upon a screw-shaft $i$ held in suitable bearings in the end of the frame A, the said nut being prevented from revolving with the screw-shaft by a pin $i^2$ extending from it, which pin moves freely in a slot $i^{21}$ in the rail $A^2$, or in a part carried by that rail. When the screw-shaft $i$ is rotated by the hand-wheel $i^3$, the nut $i'$, and consequently the plate or rail $a$, will be adjusted into any required position. The levers $h$ on one side of a frame are or may be connected with the levers on the other side of the frame to move together therewith.

Figure 15:
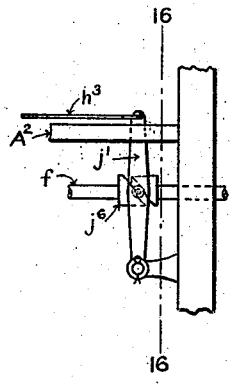
Figures 16, 19:
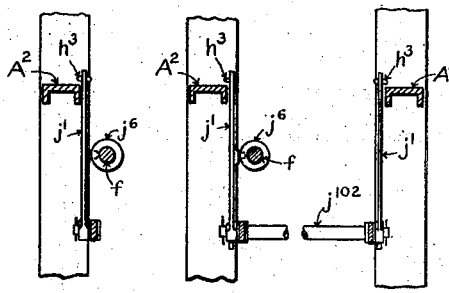

In Figs. 8 and 9 we have shown self-acting means whereby the levers $h$ may be operated to move the plate or rail $a$ up and down in proper accord with the movements of the ring-rail. At $f$ in these figures is the shaft shown in Figs. 1 to 4, it extending lengthwise of the frame at one side thereof, and being connected as in Figs. 1 to 4 or otherwise in usual manner with the pokers of the ring-rail. At $j$ is shown a cam of suitable shape mounted upon the shaft $f$ and acting upon a bowl or stud on a lever $j'$ having its fulcrum on a stud $j^2$ carried by the framing, or by a bracket projecting from the framing. The end of the lever $j'$ has a short length of chain $j^{11}$ attached to it that passes partly around a pulley $j^3$ free to turn on a stud $j^4$ on a bracket secured to the rail $A^2$. The other end of the said short chain is connected with the rod or wire $b^6$ on the same side of the frame, and thus, as the shaft $f$ and cam $j$ oscillate, the plate or rail $a$ will be moved up and down accordingly. When the shaft $f$ is turned by hand, as it may be to lower the ring-rail to the position for doffing, the shape and arrangement of the cam $j$ permit of the plate or rail $a$ being lowered also to the proper doffing position. Instead of the disk-cam $j$ being employed, as shown, a drum-cam $j^6$, Figs. 15 and 16 may be used, the action of such cam being in a line with the shaft $f$, and when this latter form of cam is used the lever $j'$ will be changed in position accordingly as shown in Figs. 15 and 16, and the wire or rod $h^3$ may be connected directly with the end of the said lever as in said figures. The pulley $j^3$ may be a pulley with three grooves, and the short lengths of jointed chain in each groove may be attached thereto, one chain, $j^{12}$, see Fig. 9, extending between the lever $j'$ and its groove, say the middle groove, another chain $j^{13}$ extending from the lower groove to the wire or rod $h^3$ on the first side of the frame, and another $j^{14}$ extending from the third groove to and around a pulley $j^{31}$ on the other side of the frame, where it is connected with the wire or rod $h^3$ on the latter side. Thereby, the anti-ballooning arrangements on both sides of the frame may be simultaneously actuated from the same cam. It is obvious that instead of chains and pulleys levers may be used, and a shaft may be used to connect the mechanism on one side of the frame with that on the other side, if desired.

Figure 17:
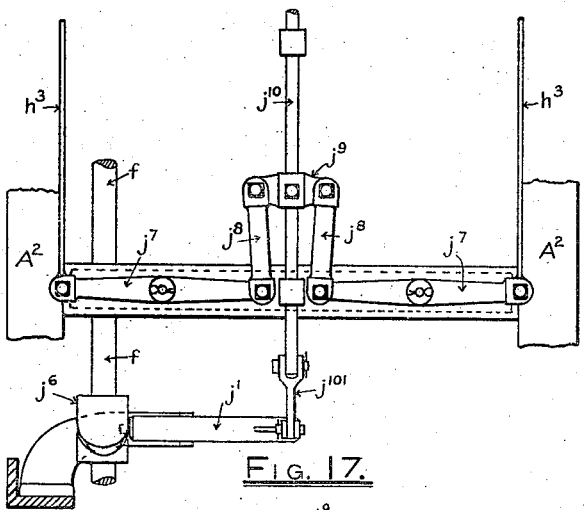
Figure 18:
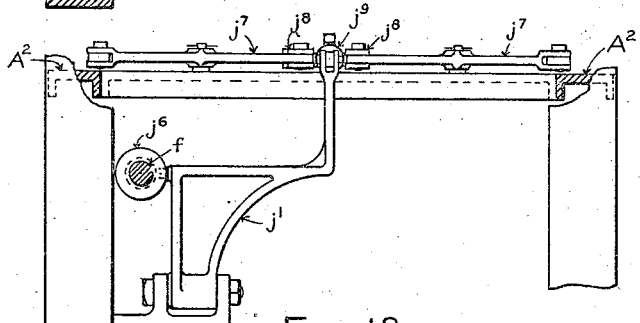

Figs. 17 and 18 show one of the arrangements of levers and connections that may be employed as just mentioned, if desired. It is to be understood, however, that no particular form and arrangement of the levers and their connections is regarded by us as especially important. Fig. 17 is a plan view illustrating sufficient to make clear the modification intended to be represented therein. Fig. 18 is a partly sectional elevation of the parts which are shown in Fig. 17. At $j^7$, $j^7$, in these figures are represented horizontal levers having their outer ends joined or connected to the wires or rods, $h^3$, $h^3$, and their inner ends connected by short rods or links, $j^8$, $j^8$, to a crosspiece or head, $j^9$, on a sliding rod, $j^{10}$, that is joined by a short rod or link, $j^{101}$, to the lever, $j'$, the latter being actuated by a drum-cam, $j^6$, on the shaft, $f$.

Fig. 19 is a sectional elevation showing an arrangement in which a shaft is used to connect the mechanism on one side of the frame with that on the other side, if desired, as stated above. In this figure the levers, $j'$, $j'$, on opposite sides of the frame are made fast upon a rock-shaft, $j^{102}$, one of the said levers being engaged and actuated by the drum-cam, $j^6$, on the shaft, $f$.

In the modification represented in Figs. 7, 8 and 9, the handle $g$ and adjacent parts shown in Figs. 1 and 13 may be employed, if desired, or, in place thereof, a lengthening and shortening or releasing arrangement such as that which is shown in Fig. 6ª may be used. In this case the rod $b^6$ of Fig. 6ª would correspond with the first length of rod or wire $h^3$ between the cam lever $j'$ and the arm $h^2$ of the first lever $h$, and the said arm $h^2$ would correspond with the arm $f^4$ of Fig. 6ª.

The improved form of anti-ballooning or yarn-separating arrangement has its advantages over other arrangements known prior to the date of our invention. It forms its own rail, the holes are smooth and perfectly circular and concentric with the spindles, and there is no liability of bending or derangement of position as in anti-balloon rings, wires, or plates, or other guards, attached to a rail.

The particular modifications of our invention which are represented in Figs. 6 to 12, inclusive, of our drawings, have been claimed specifically in our other applications for patents for improvements in ring-spinning and doubling frames filed on the same date herewith, Serial Nos. 465,253 and 465,254. We, therefore, do not lay specific claim to such modifications herein.

Obviously, our improved supporting and actuating mechanism is not confined to use in connection with the precise form of anti-ballooning or yarn-separating arrangements herein presented. We contemplate employing the said mechanism in connection with other known and suitable forms and arrangements of anti-ballooning or yarn-separating devices which are located beside the spindles of the ring frame, or the like.

We claim as our invention—

1. The plate or rail $a$ formed with circular holes as described and with a front edge having swells and re-entrant angles, and having slits leading from the said angles and entering the holes at about tangents to the circles of the holes, substantially as described.

2. The combination with the plate or rail $a$ formed with circular holes as described and with a front edge having swells and re-entrant angles, and also having slits leading from the the said angles and entering the holes at about tangents to the circles of the holes, of rods by which the said plate or rail is supported, and means for moving the rods vertically to raise and lower the plate or rail, substantially as described.

3. The combination with the ring-rail, and operating means for the ring-rail, of a plate or rail having anti-ballooning arrangements located beside the spindles, a rod by which the plate or rail is supported, and means for moving the said rod and the plate or rail carried thereby in unison with the ring-rail but through a traverse of less extent than that of the ring-rail, substantially as described.

4. The combination with the ring-rail, and operating means for the ring-rail, of a plate or rail having anti-ballooning arrangements located beside the spindles, a rod by which the said plate or rail is supported, a guide whereby the said rod is held in vertical position, and means for moving the said rod and the plate or rail carried thereby in unison with the ring-rail but through a traverse of less extent than that of the ring-rail, substantially as described.

5. The combination with the ring-rail, and operating means for the ring-rail, of a plate or rail having anti-ballooning arrangements located beside the spindles, a rod by which the said plate or rail is supported, a guide through which the rod slides and whereby the said rod is held in vertical position, and means for moving the said rod and the plate or rail carried thereby in unison with the ring-rail but through a traverse of less extent than that of the ring-rail, substantially as described.

6. The combination with the ring-rail, and operating means for the ring-rail, of a plate or rail having anti-ballooning arrangements located beside the spindles, and means for moving said plate or rail in unison with the ring-rail and in the same direction but at a reduced speed, substantially as described.

7. The combination with the ring-rail, and operating means for the ring-rail, of a plate or rail having anti-ballooning arrangements located beside the spindles, a rod by which the said plate or rail is supported, a guide through which the rod slides and whereby the said rod is held in vertical position, and means for moving the said rod and the plate or rail carried thereby in unison with the ring-rail and in the same direction but at a reduced speed, substantially as described.

8. The combination with the ring-rail, and operating means for the ring-rail, of a plate or rail having anti-ballooning arrangements located beside the spindles, a rod by which the said plate or rail is supported, a guide through which the rod slides and whereby the said rod is held in vertical position, and means for moving the said rod and the plate or rail carried thereby in unison with the ring-rail and in the same direction but at a reduced speed and through a traverse of less extent than that of the ring-rail, substantially as described.

9. The combination with the ring-rail, a plate or rail having anti-ballooning arrangements located beside the spindles, and a rod supporting said plate or rail, of a moving member of the copping mechanism and separate trains of connections between the said moving member and the ring-rail and rod, whereby the ring-rail and plate or rail are independently actuated from the said moving member and caused to move in unison but with a traverse of the plate or rail of less extent than that of the ring-rail, substantially as described.

10. The combination with the ring-rail, a plate or rail having anti-ballooning arrangements located beside the spindles, a rod supporting said plate or rail, and a guide through which the rod slides and whereby the said rod is held in vertical position, of a moving member of the copping mechanism and separate trains of connections between the said moving member and the ring-rail and rod, whereby the ring-rail and plate or rail are independently actuated from the said moving member and caused to move in unison but with a traverse of the plate or rail of less extent than that of the ring-rail, substantially as described.

11. The combination with the ring-rail, a plate or rail having anti-ballooning arrangements located beside the spindles, a rod supporting said plate or rail, and a guide through which the rod slides and whereby the said rod is held in vertical position, of a moving member of the copping mechanism and separate trains of connections between the said moving member and the ring-rail and rod, whereby the ring-rail and plate or rail are independently actuated from the said moving member and caused to move in unison but with a traverse of the plate or rail of less extent than that of the ring-rail, and at a reduced speed, substantially as described.

12. The combination with the ring-rail, and a plate or rail having anti-ballooning arrangements located beside the spindles, of the copping-shaft $f$, and separate trains of connections intermediate the said shaft and the ring-rail and plate or rail whereby the latter are moved in unison but with the traverse of the said plate or rail less in extent than that of the ring-rail, substantially as described.

13. The combination with the ring-rail, its poker, a plate or rail having anti ballooning arrangements located beside the spindles, and a rod by which said plate or rail is supported, of the copping-shaft $f$ and operating connections intermediate the said shaft and the poker and rod, embracing blocks or pulleys on said shaft, and chains whereby the ring-rail and plate or rail are moved in unison but with the traverse of the said plate or rail less in extent than that of the ring-rail, substantially as described.

14. The combination with the ring-rail, its poker, a plate or rail having anti-ballooning arrangements located beside the spindles, and a rod by which said plate or rail is supported, of the copping-shaft $f$, blocks or pulleys on said shaft, one of them less in diameter than the other and serving for the actuation of the plate or rail, and connections intermediate the said blocks or pulleys and the poker and rod, embracing chains, whereby the ring-rail and plate or rail are moved in unison but with the traverse of the said plate or rail less in extent than that of the ring-rail, substantially as described.

15. The combination with the ring-rail, and a plate or rail having an anti-ballooning arrangement, of a moving member of the copping mechanism having separate operative connection with the ring-rail and the said plate or rail, and a stop for arresting the descent of the ring-rail before the termination of that of the plate or rail when the ring-rail and plate or rail are depressed for doffing, substantially as described.

16. The combination with the ring-rail, its poker, a plate or rail having an anti-ballooning arrangement, and a rod for supporting the said plate or rail, of the copping-shaft $f$, blocks or pulleys thereon, connections intermediate said blocks or pulleys and poker and rod, embracing chains, and a stop for arresting the descent of the ring-rail before the termination of that of the plate or rail when the ring-rail and plate or rail are depressed for doffing, substantially as described.

17. The combination with the ring-rail, and a plate or rail having an anti-ballooning arrangement, of a copping-shaft $f$, separate trains of operating connections intermediate the said shaft and the ring-rail and plate or rail, and means whereby the said shaft may be turned by hand to lower the ring-rail and plate or rail for doffing, substantially as described.

18. The combination with the ring-rail, and a plate or rail having an anti-ballooning arrangement, of a copping-shaft $f$, separate trains of operating connections intermediate the said shaft and the ring-rail and plate or rail, means whereby the said shaft may be turned by hand to lower the ring-rail and plate or rail for doffing, and a stop for arresting the descent of the ring-rail before the termination of that of the plate or rail, substantially as described.

19. The combination with the ring-rail, and a plate or rail having an anti-ballooning arrangement, of a copping-shaft $f$, separate trains of operating connections intermediate the said shaft and the ring-rail and plate or rail, a notched disk fast on said shaft, a handle carrying a pawl to engage with said disk and whereby the shaft may be turned by hand to lower the ring-rail and plate or rail for doffing, and a stop for arresting the descent of the ring-rail before the termination of that of the plate or rail, substantially as described.

20. The combination with the ring-rail, and a plate or rail having an anti-ballooning arrangement, of a copping-shaft $f$, separate trains of operating connections intermediate the said shaft and the ring-rail and plate or rail, a notched disk or disks fast on the said shaft, a handle provided with a pawl for engaging with the notch of said disk or of one of the disks, whereby to turn the said shaft to lower the ring-rail and plate or rail for doffing, a pawl to engage with a notch of said disk or of one of the disks to prevent the return of the parts, and a stop for arresting the descent of the ring-rail before that of the plate or rail is terminated, substantially as described.

In testimony whereof we have hereunto affixed our signatures in the presence of two witnesses.

GEORGE SHEPHERD.
HENRY MIDGLEY.

Witnesses:
JAMES S. BROADFOOT,
HERBERT R. ABBEY.